(12) United States Patent
Yi et al.

(10) Patent No.: US 12,056,948 B2
(45) Date of Patent: Aug. 6, 2024

(54) LINE ITEM DETECTION IN BORDERLESS TABULAR STRUCTURED DATA

(71) Applicant: International Business Machines Corporation, Armonk, NY (US)

(72) Inventors: Ang Yi, Beijing (CN); Nazrul Islam, San Jose, CA (US); Rajesh M. Desai, San Jose, CA (US); Jing Zhang, Beijing (CN); Dong Rui Li, Beijing (CN); Xue Mei Deng, Beijing (CN); Ye Chen, Beijing (CN); Hai Cheng Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 17/379,154

(22) Filed: Jul. 19, 2021

(65) Prior Publication Data

US 2023/0012784 A1    Jan. 19, 2023

(51) Int. Cl.
| | |
|---|---|
| *G06K 9/00* | (2022.01) |
| *G06F 18/23* | (2023.01) |
| *G06K 9/34* | (2006.01) |
| *G06K 9/62* | (2022.01) |
| *G06V 30/148* | (2022.01) |
| *G06V 30/413* | (2022.01) |
| *G06V 30/414* | (2022.01) |
| *G06V 30/10* | (2022.01) |

(52) U.S. Cl.
CPC .......... *G06V 30/414* (2022.01); *G06F 18/23* (2023.01); *G06V 30/158* (2022.01); *G06V 30/413* (2022.01); *G06V 30/10* (2022.01)

(58) Field of Classification Search
CPC ...... G06F 18/23; G06V 30/10; G06V 30/158; G06V 30/19107; G06V 30/412; G06V 30/413; G06V 30/414
See application file for complete search history.

(56) References Cited

U.S. PATENT DOCUMENTS

| | | |
|---|---|---|
| 9,990,347 B2 | 6/2018 | Raskovic |
| 10,339,212 B2 | 7/2019 | Agrawal |
| 2019/0050381 A1 | 2/2019 | Agrawal |

(Continued)

OTHER PUBLICATIONS

Jahan et al., "Locating Tables in Scanned Documents for Reconstructing and Republishing", Proceedings of the 7th International Conference on Information and Automation for Sustainability, Colombo, Sri Lanka, Dec. 22-24, 2014, 6 pages, <https://arxiv.org/ftp/arxiv/papers/1412/1412.7689.pdf>.

(Continued)

*Primary Examiner* — Michael J Vanchy, Jr.
(74) *Attorney, Agent, or Firm* — Edward J. Wixted, III

(57) ABSTRACT

In an approach, a processor identifies a plurality of text separators in a borderless table, a text separator of the plurality of text separators defining a non-text region between two consecutive text lines in the borderless table. A processor classifies the plurality of text separators into a number of target clusters comprised in a target group based on property information related to the plurality of text separators, the number of target clusters corresponding to a number of separator types. A processor provides indication information to indicate respective separator types of the plurality of text separators based on a result of the classifying.

20 Claims, 17 Drawing Sheets

(56) References Cited

U.S. PATENT DOCUMENTS

2019/0340240 A1* 11/2019 Duta ..................... G06V 30/15
2020/0042785 A1* 2/2020 Burdick ............... G06V 30/416
2020/0073878 A1* 3/2020 Mukhopadhyay ... G06V 30/412

OTHER PUBLICATIONS

Mell et al., "The NIST Definition of Cloud Computing", National Institute of Standards and Technology, Special Publication 800-145, Sep. 2011, 7 pages.
Sahoo et al., "Auto-Table-Extract: A System to Identify And Extract Tables From PDF To Excel", International Journal of Scientific & Technology Research, vol. 9, Issue 05, May 2020, 5 pages, <http://www.ijstr.org/final-print/may2020/Auto-table-extract-A-System-To-Identify-And-Extract-Tables-From-Pdf-To-Excel.pdf>.

\* cited by examiner

400 ↘

```
SCHEDULE K-1          OTHER INFORMATION, BOX 20,
CODE Z
                    ← 410

DESCRIPTION                        PARTNER FILING INSTRUCTIONS           AMOUNT

2021: GROSS RECEIPTS FOR UBTI
REPORTED ON LINE 1                           ← 420                      7,228,122.
2022: GROSS DEDUCTIONS FOR UBTI
REPORTED ON LINE 1                                                      8,629,237.
2023: SEC. 743(B) ADJUSTMENTS
INCLUDED IN LINE 1 AND/OR LINE
10                                                                        668,352.
2024: FEDERAL BONUS
DEPRECIATION ADJUSTMENT FOR
LINE 1                                                                    -72,115.
U.S. INTEREST (PART OF LN 5/6A) SEE STATE INSTRUCTIONS                  1,484,894.

SCHEDULE K-1           CURRENT YEAR INCREASES (DECREASES)

DESCRIPTION                                     AMOUNT           TOTALS

ORDINARY INCOME (LOSS)                        5,875,339.
INTEREST INCOME                               1,371,208.
DIVIDEND INCOME                              12,545,460.
SHORT-TERM CAPITAL GAIN (LOSS)               14,300,979.
LONG-TERM CAPITAL GAIN (LOSS)                75,361,768.
SECTION 1231 GAIN (LOSS)                     -1,411,107.
OTHER PORTFOLIO INCOME                        2,664,709.
OTHER INCOME (LOSS)                                -361.

SCHEDULE K-1 INCOME SUBTOTAL                             110,707,987.

CHARITABLE CONTRIBUTIONS                         -2,005.
INTEREST EXPENSE ON INVESTMENT DEBTS           -515,884.
PORTFOLIO DEDUCTIONS                         -5,896,750.
FOREIGN TAXES                                   -72,232.

SCHEDULE K-1 DEDUCTIONS SUBTOTAL                          -6,486,871.

NET INCOME (LOSS) PER SCHEDULE K-1                       104,221,116.
                                                   ← 430

NONDEDUCTIBLE EXPENSES                          -97,894.
CHANGE IN ACCRUED DIVIDENDS INCREASE/(DECREASE) -97,942.
CHANGE IN UNREALIZED APPRECIATION/(DEPRECIATION) -91,380,056.

OTHER INCREASES OR DECREASES SUBTOTAL  ← 440             -91,575,892.

TOTAL TO SCHEDULE K-1, ITEM L                             12,645,224.
                                 ← 450            452 ↗
```

CLASSIFICATION BASED ON 6-CLUSTER GROUP

[Figure 400 showing classification of lines 710-1 through 710-35 with Similarity (S) and Dissimilarity (D) markers]

- [S] 902: SIMILARITY
- [D] 904: DISSIMILARITY

CLUSTER 1 INCLUDING: 710-1, 710-5, 710-7~710-10, 710-17~710-23, 710-26~710-28, 710-32, 710-33

CLUSTER 2 INCLUDING: 710-3, 710-16

CLUSTER 3 INCLUDING: 710-4, 710-6, 710-11, 710-12

CLUSTER 4 INCLUDING: 710-14, 710-31

CLUSTER 5 INCLUDING: 710-2, 710-25

CLUSTER 6 INCLUDING: 710-24, 710-25, 710-29, 710-30, 710-34, 710-35

FIG. 9B

[S] 902: SIMILARITY
[D] 904: DISSIMILARITY

CLUSTER 1 INCLUDING: 710-2, 710-15

CLUSTER 2 INCLUDING: 710-14, 710-31

CLUSTER 3 INCLUDING: 710-5, 710-7, 710-8, 710-13, 710-19, 710-21, 710-22, 710-28

CLUSTER 4 INCLUDING: 710-24, 710-25, 710-29, 710-30, 710-34, 710-35

CLUSTER 5 INCLUDING: 710-3, 710-16

CLUSTER 6 INCLUDING: 710-4, 710-6, 710-11, 710-12

CLUSTER 7 INCLUDING: 710-10, 710-17, 710-20, 710-23, 710-26, 710-32, 710-33

CLUSTER 8 INCLUDING: 710-1, 710-9, 710-18, 710-27

LINE ITEM DETECTION IN BORDERLESS TABULAR STRUCTURED DATA

BACKGROUND

The present invention relates generally to the field of data analysis techniques, and more particularly to line item detection in borderless tabular structured data.

Tables are used to represent data in tabular format. There are numerous cases where data is represented in tabular format (e.g., purchase orders, receipts, invoices, financial reports, etc.). Table analysis techniques aim to digitize, classify, and extract unstructured contents in tables, such as to localize and identify the table header, table footer, key-value pairs contained in the cells, and the like. As padding, margin, and borders applicable in tables are varied and cells can span over multiple cells in both horizontal and vertical directions, which may cause numerous structural variations. The arrangement of tabular data does not follow restrict rules and usually is up to the author's intention.

Some tabular data is designed to conform to row-column form but does not have any lines delineating the rows and columns. Such a table is referred to as a borderless table. The analysis becomes more challenging when the tabular data in rows and columns are arranged without border structure.

SUMMARY

According to one embodiment of the present invention, a computer-implemented method, computer program product, and computer system are provided. A processor identifies a plurality of text separators in a borderless table, a text separator of the plurality of text separators defining a non-text region between two consecutive text lines in the borderless table. A processor classifies the plurality of text separators into a number of target clusters comprised in a target group based on property information related to the plurality of text separators, the number of target clusters corresponding to a number of separator types. A processor provides indication information to indicate respective separator types of the plurality of text separators based on a result of the classifying.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 depicts an example borderless table, in accordance with an embodiment of the present invention.

FIG. 7 depicts example text separators identified from an example borderless table, in accordance with an embodiment of the present invention.

FIGS. 9A-9C depict examples of text separator classification for some candidate groups, in accordance with an embodiment of the present invention.

DETAILED DESCRIPTION

Figure 1:
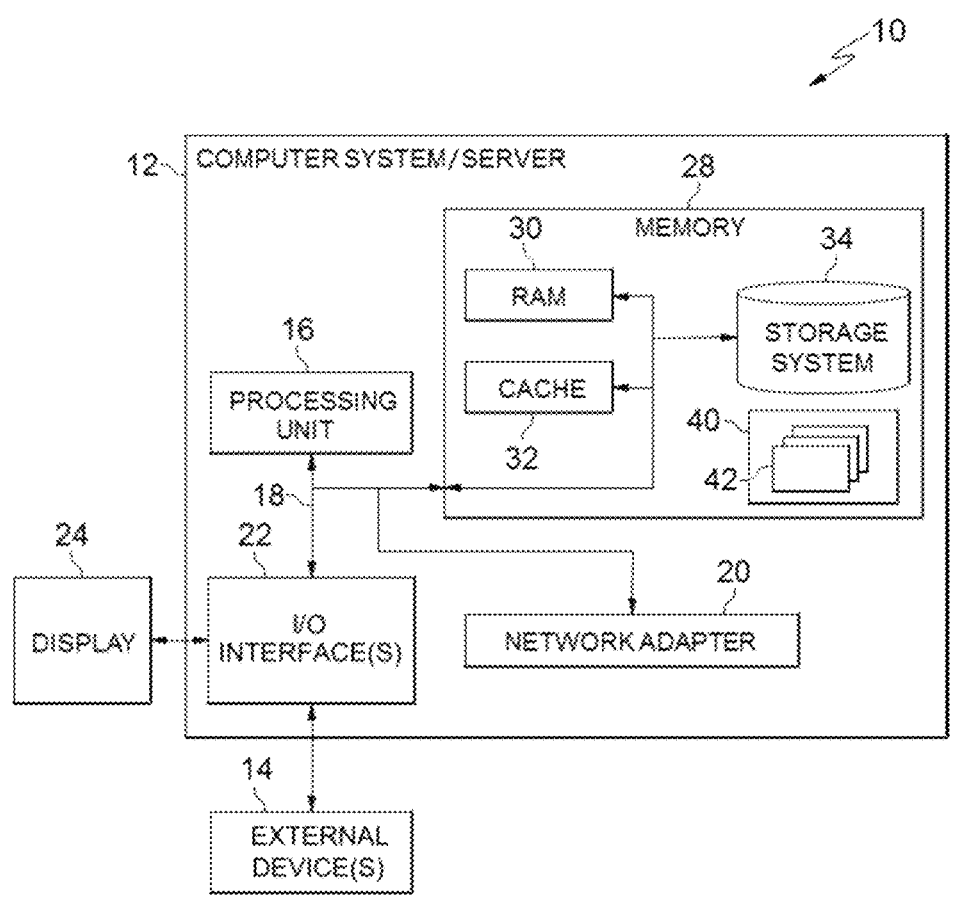
FIG. 1 depicts a cloud computing node, in accordance with an embodiment of the present invention.

Some embodiments will be described in more detail with reference to the accompanying drawings, in which the embodiments of the present disclosure have been illustrated. However, the present invention can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
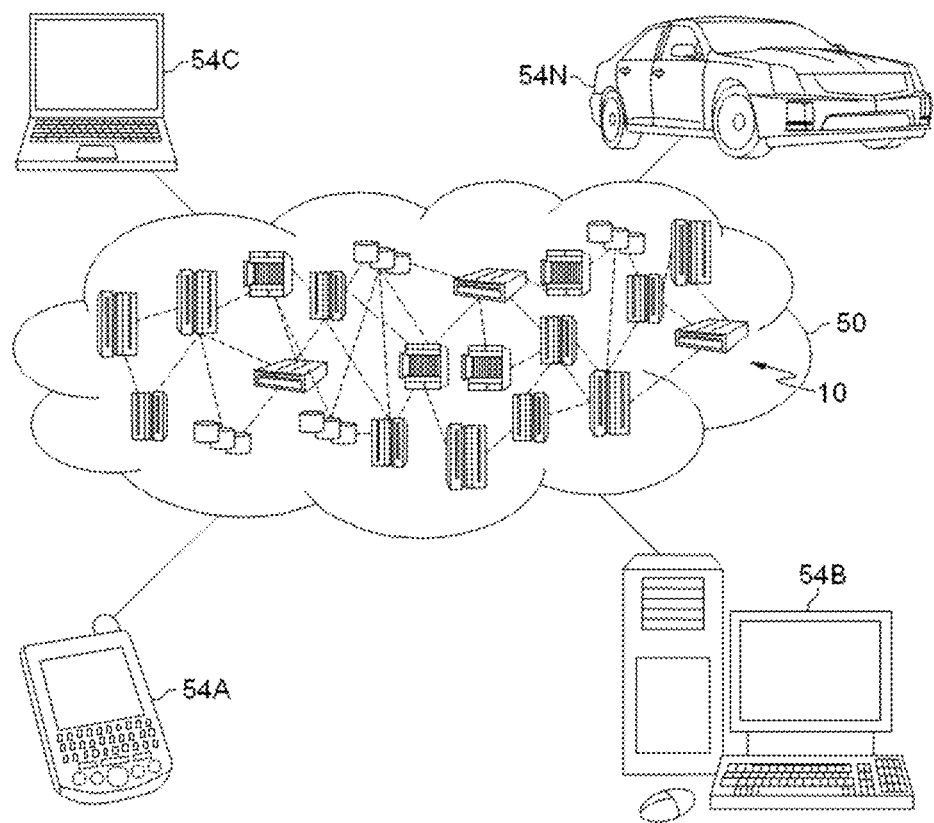
FIG. 2 depicts a cloud computing environment, in accordance with an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
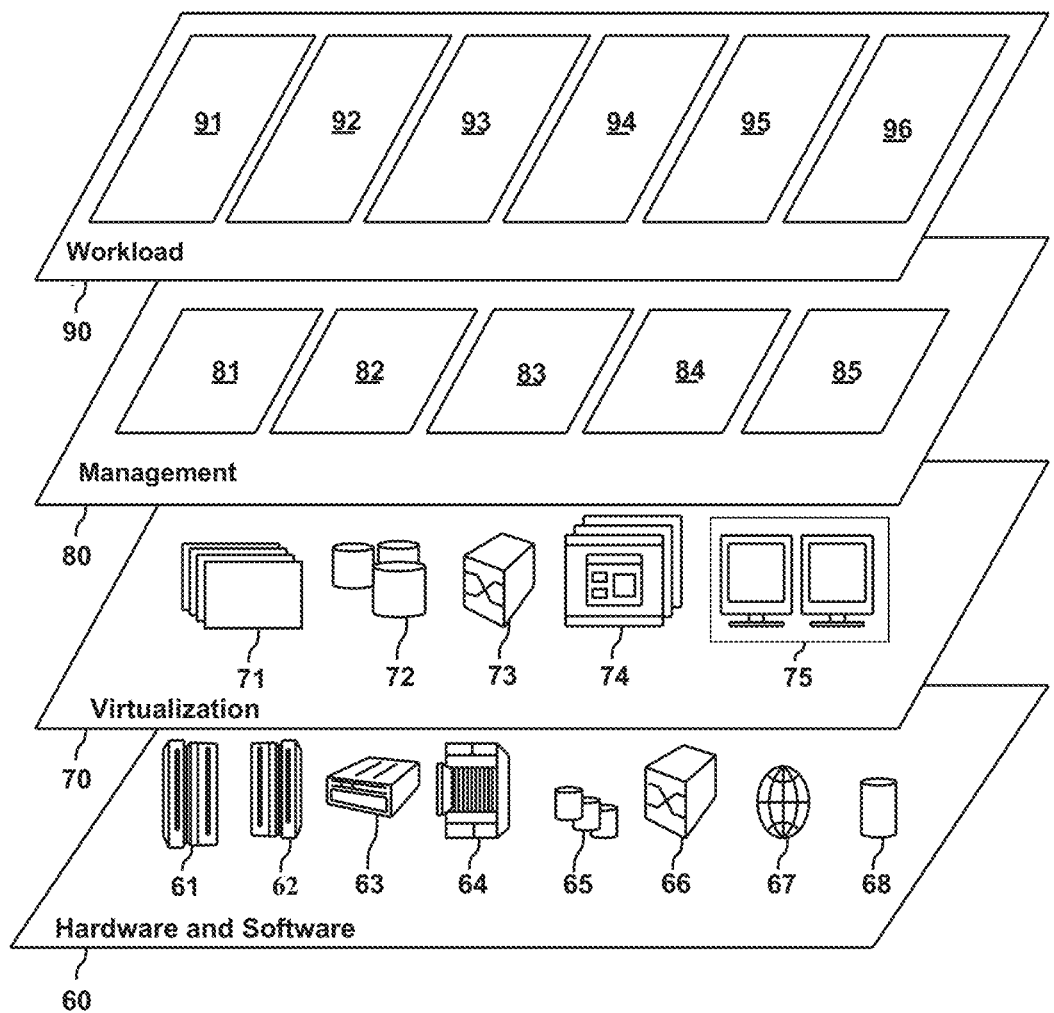
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document analysis 96.

Tabular data in a table is arranged to conform to a row-column form. Tabular data may be included or presented in various documents, such as Portable Document Format (PDF) documents, images, papers, scanned files, and so on. To analyze the tabular data, tabular data in non-editable documents can be converted to machine processable data.

Table analysis techniques aim to digitize, classify, and extract unstructured contents in tables. Embodiments of the present invention recognize that automatic and accurate content extraction and semantic understanding on tables is challenging due to structural variations of tables and becomes more challenging if there are no complete visible lines delineating the rows and columns of the tabular data. As used herein, a borderless table refers to a table without border lines or with incomplete border lines.

Borderlines in tables can facilitate the identification and separation of text in different lines of a table. Embodiments of the present invention recognize that, due to lack of visible borders, reliable automated detection of a borderless table is difficult. FIG. 4 depicts an example borderless table 400. In this example, text in a table header may be arranged in multiple lines as illustrated in a region 410, and text in a cell may also be arranged in multiple lines as illustrated in a region 420. Further, there may be a region 430 containing multiple empty cells across multiple row lines and column lines. The borderless table 400 may also contain some summary information in a region 440 which is different from a table header, table body text, and the like. Due to misalignment in line, text contained in a region 450 of the borderless table 400 may not be paired with text contained in a region 452 although they semantically form a key-value pair.

Generally, text contained in the borderless table 400 can be extracted, for example, by means of optical character recognition (OCR), PDF text extraction, and other suitable techniques. It is expected to further correctly identify and segment the detected text arranged in the borderless table. However, due to lack of border lines, it is required to carefully handle the line item detection and construction.

According to embodiments of the present disclosure, there is proposed a solution for line item detection in borderless tabular data. In embodiments of this solution, text separators separating text lines in a borderless tabular data are identified. A target group comprising a certain number of clusters each corresponding to a separator type are determined. The identified text separators are classified into the clusters of the target group. Based on the result of the classifying, the separator types of the identified text separators can be determined. As such, the separator types can provide more insights for the separation of lines in the borderless table and facilitate automatic analysis and processing of the text contained in the table.

Other advantages of the present disclosure will be described with reference to the example embodiments and the accompanying drawings below.

Figure 5:
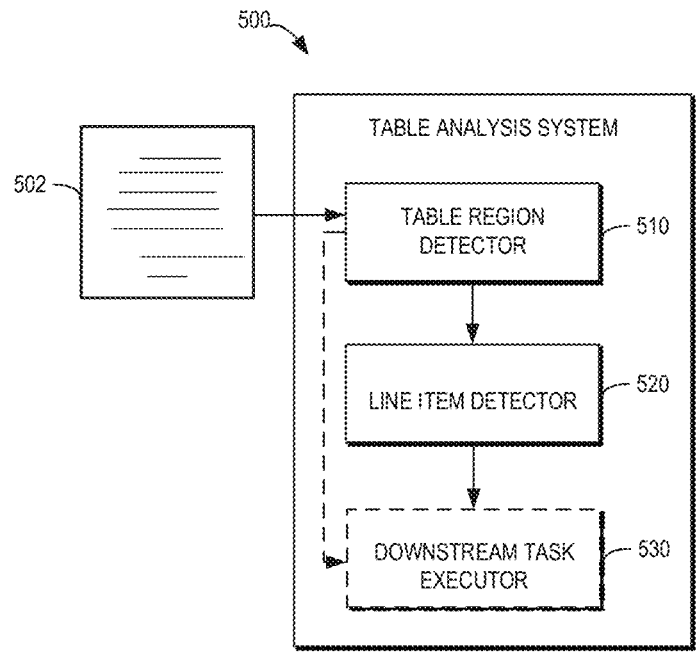
FIG. 5 depicts a block diagram of a table analysis system in which an embodiment of the present invention can be implemented.

Reference is first made to FIG. 5, which illustrates a block diagram of a table analysis system 500 in which embodiments of the present disclosure can be implemented. The table analysis system 500 is configured to detect and analyze a table from a document 502. The document 502 may of any suitable format, such as a PDF document, a Word document, an image, a scanned file, or other documents comprising tabular data.

The table analysis system 500 comprises a table region detector 510 to detect a tabular data region in the document 502. Such a tabular data region may form a table. In some embodiments, the tabular data region in the document 502 may be indicated in other ways instead of applying the automatic detection techniques. For example, it may be specified by users that a whole page of the document 502 contains a table.

In some cases, the table detected in the document 502 may be a borderless table without border lines or with incomplete border lines (for example, the borderless table 400 in FIG. 4). The table analysis system 500 according to embodiments of the present disclosure further comprises a line item detector 520 which is configured to perform line item detection on the detected table. The line item detector 520 may identify one or more separator types that are presented in the table and used to define a structure of text in the table. The line item detection according to the embodiments of the present disclosure will be discussed in detail.

The result of the line item detection may be provided for a downstream task executor 530 which is configured to perform a downstream task on the table detected by the table region detector. The downstream task may include any tasks related to table understanding, data extraction, and the like.

In some cases, the table analysis system 500 may be further configured to detect text presented in the table. There are various techniques applicable for table region detection and text detection. For example, optical character recognition (OCR) techniques may be applied to recognize text presented in an image or a scanned file, and text from PDF or word processor documents can be directly extracted via suitable tools. In some embodiments, the text detection may be performed before the line item detection and used to assist in the line item detection. In some embodiments, the result of the line item detection may be used to assist in identifying text presented in the table, so as to improve accuracy of the text detection.

It may be appreciated that the components of the table analysis system 500 shown in FIG. 5 may be implemented as one or more software engines, components, or the like, which are configured with logic for implementing the functionality attributed to the particular module. Each component may be implemented using one or more of such software engines, components or the like. The software engines, components, and the like are executed on one or more processors of one or more computing systems or devices and utilize or operate on data stored in one or more storage devices, memories, or the like, on one or more of the computing systems.

Figure 6:
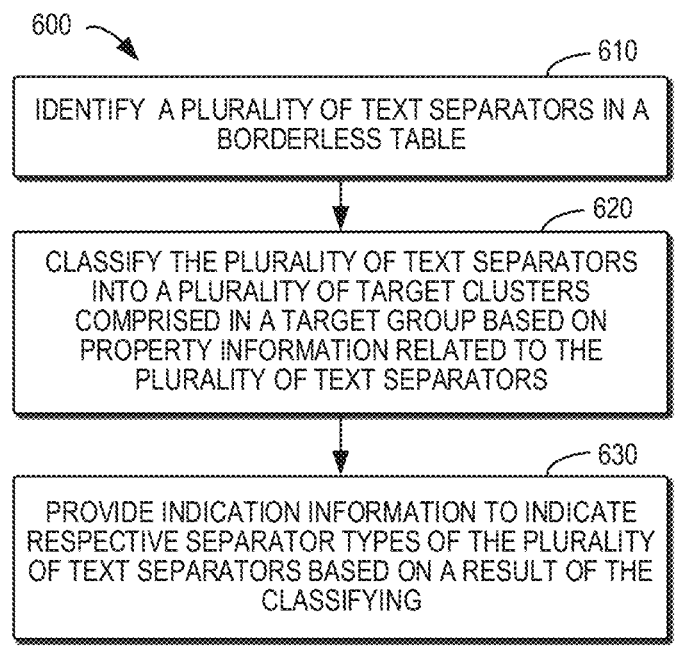
FIG. 6 depicts a flowchart of an example process, in accordance with an embodiment of the present invention.

FIG. 6 depicts a flowchart of an example process 600 in accordance with some embodiments of the present disclosure. The process 600 can be implemented by the table analysis system 500, or more specifically, by the line item detector 520 in the table analysis system.

At block 610, the line item detector 520 identifies a plurality of text separators in a borderless table. A text separator is identified as a spacing that separates text line, and thus can define a non-text region between two consecutive text lines in the borderless table. A text line is a line space in the table that is determined to contain textual information. The text lines may be detected from the borderless table by various means. For example, OCR is performed by scanning the borderless table based on scanning lines and thus the resulting text is provided in text lines. In other examples, text lines may be detected by other vision processing techniques, by means of document editing/reading tools, or the like.

In some embodiments, a text separator may be determined to define a rectangular non-text region. In some embodiments, if some text lines of the borderless table are arranged in a horizontal direction, a text separator may be identified to define a horizontal region in the borderless table in which no textual information is contained between two consecutive text lines. The text lines in the horizontal direction may be arranged in one or more rows of the borderless table. In such case, text lines separated by a horizontal text separator may include text lines above and below this separator. In some cases, if some text lines of the borderless table are arranged in a vertical direction, a text separator may be identified to define a vertical non-text region in the borderless table. The text lines in the vertical direction may be arranged in one or more columns of the borderless table. In such case, a vertical text separator is used to separate left and right separators.

In the following examples, for the purpose of discussion, horizontal text separators are illustrated and discussed in example embodiments, which may be similarly applied for the vertical text lines.

Figure 7:
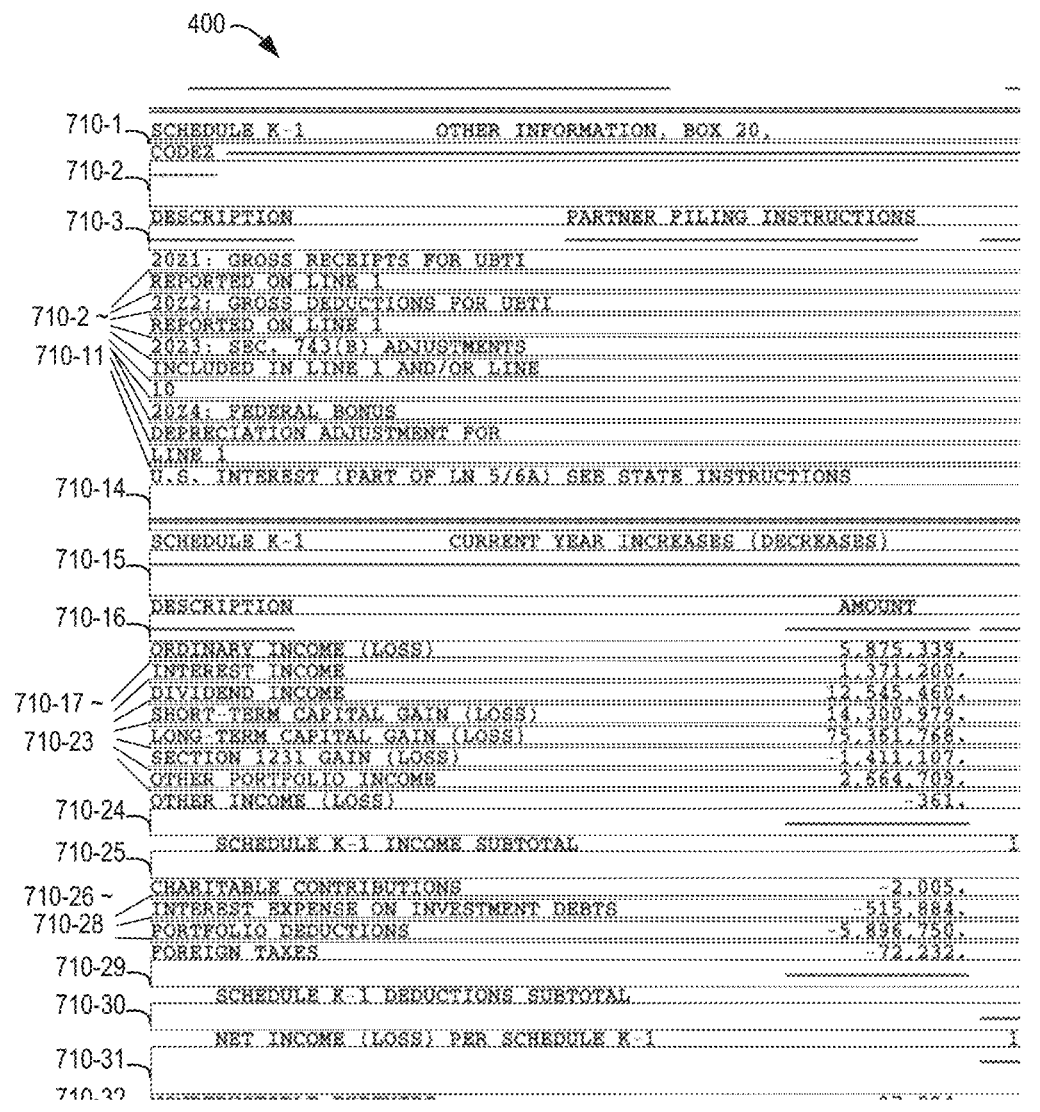

FIG. 7 depicts example text separators identified from the example borderless table 400 of FIG. 4 in accordance with some embodiments of the present disclosure. As illustrated, text separators 710-1 through 710-35 (collectively or individually referred to as text separators 710) are identified from the borderless table 400. Those text separators are illustrated as horizontal rectangular non-text regions, each separating two text lines.

It would be appreciated that the borderless table 400 is provided as a specific example here and in the following description, without suggesting any limitations to the scope of the present disclosure.

At block 620, the line item detector 520 classifies the plurality of text separators into a number of target clusters comprised in a target group based on property information related to the plurality of text separators. The number of target clusters is corresponding to a number of separator types. That is, each target cluster is corresponding to a separator type.

Generally, a text separator of a separator type may separate different types of text regions in the borderless table or separate text lines within a same type of text region in the borderless table.

Example separator types may include but are not limited to a table region separator which separates tables or sub-tables presented in a table region, a table header separator which separates a table header and a table body, a table row separator which separates different rows within a same text region, an in-cell line separator which separates text lines within a single cell of a table, a summary table separator which separates a text region containing summary information and other types of text region, a table footer separator which separates a table body and a table footer. Among those separator types, the table region separator, the table row separator, and the in-cell line separator generally each locate between text lines within a same type of text region, and other separators locate between text lines of different types of text regions.

Text in the borderless tables may be arranged in various layouts. For the purpose of easy understanding by readers, separations for different types of text regions in the borderless tables may show different properties. Thus, the line item detector 520 may collect the property information related to the text separators in the borderless table and use the collected property information to perform the classification.

In some embodiments, the property information may indicate properties related to the non-text regions defined by the text separators, and/or properties related to text lines separated by the text separators. For a text separator, a text region of which the property information is utilized for classification may include a text line separated by and adjacent to the text separator.

In some embodiments, the property information related to the non-text regions may include the geometrical properties and/or visual properties of the non-text regions. For a text separator, the geometrical properties may include a height and/or width of a non-text region defined by this text separator, the shape of the non-text region, and the like. For a text separator, the visual properties may include presence of non-textual object (e.g., lines, bold lines, dashed lines, etc.) within the non-text region, color of a background of the non-text region, texture of the background, and the like.

In some embodiments, the property information related to the text region may include visual properties of the text lines and/or semantic properties of text present in the text lines. For a text separator, the visual properties of a text region separated by this text separator may include a front, color, size, and/or other visual properties of the text present in the text region. For a text separator, the semantic property of the text present in a text region or in the two text lines separated by the text separator may be determined through any suitable natural language processing (NLP) techniques. In those cases, the text in the borderless table may be detected before the line item detection.

Although some example properties are provided above, it would be appreciated that other suitable properties related to the text separators may also be applied.

In some embodiments, the property information related to a text separator may be represented by use of one-hot encoding. If more than one type of property is included, each type of property may be represented as a one-hot encoding and all of the properties for one text separator may be combined to form a one-hot matrix encoding.

As the number of the target clusters in the target group is predetermined, to perform the classifying, the line item detector 520 may apply a clustering algorithm to split the text separators into the predetermined number of target clusters. The number of cluster centroids may be determined as the number of target clusters. The clustering may allow for the text separators with same or similar property information to be classified into a same cluster.

Some embodiments related to the classification based on the property information will be discussed in detail below.

At block 630, the line item detector 520 provides indication information to indicate respective separator types of the plurality of text separators based on a result of the classifying.

According to the embodiments of the present disclosure, by clustering the text separators into a certain number of clusters corresponding to respective separator types, it is possible to indicate the discriminations between the text separators. In some embodiments, if the correspondence between respective clusters in the target group and the respective separator types is determined, the resulting of the classifying may directly identify associate each text separator with its separator type.

In some embodiments, the indication information about the separator types of the text separators in the borderless table may be provided for use in a downstream task related to the borderless table. For example, the line item detector 520 may provide such indication information to the downstream task executor 530 in the table analysis system 500. With such additional information about the separator types of the text separators, the downstream task may be performed in a more accurate way.

As an example, the downstream task related to the borderless table is to segment the text in the table into different text segments corresponding to cells defined by rows and columns, and populate the text segments into a structured format. The separators types of the text separators may facilitate accurate identification of different text lines, such that the text in different text lines can be segmented accurately.

In the above process, it is expected to classify a number of target clusters. In some embodiments, for a certain borderless table, the number of target clusters and/or the specific separator types corresponding to the target clusters may be predetermined or specified. Generally, the number of possible separator types may be varied among different types of tables and based on the intentions of the authors. The actual number of separator types included in a certain borderless table may not be known.

Figure 8A:
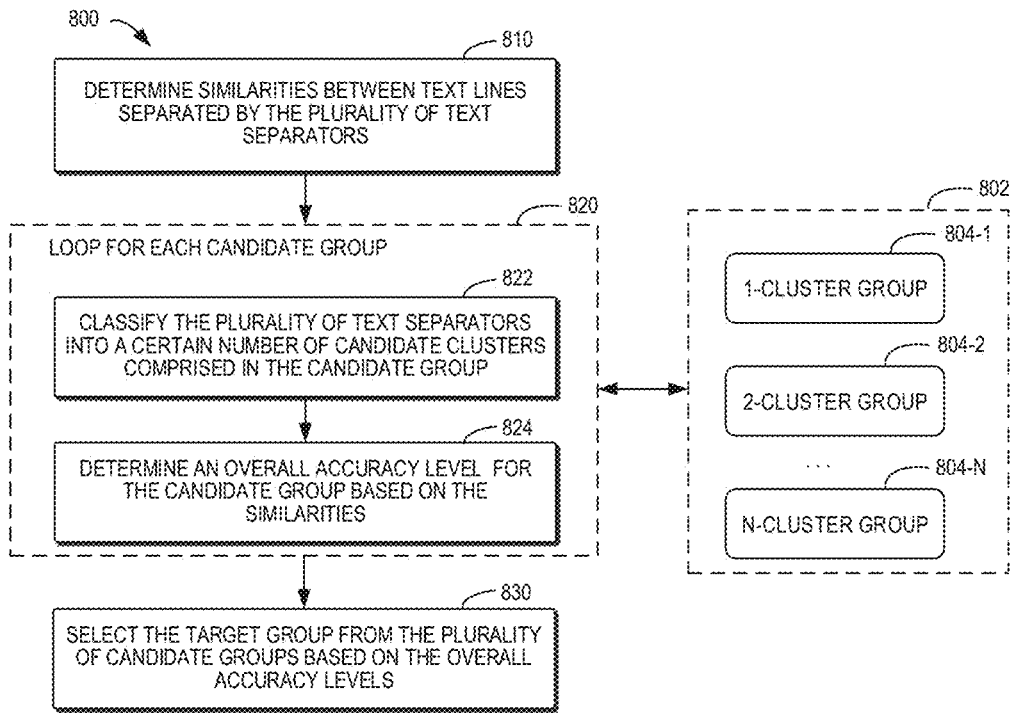
FIG. 8A depicts a flowchart of an example process of selecting a target group for classifying the text separators, in accordance with an embodiment of the present invention.

To determine a suitable target group for classifying the text separators, in some embodiments, the line item detector 520 may perform exploratory classifications of the text separators on a plurality of candidate groups and select the target group from the plurality of candidate groups based on the results of the classifications. FIG. 8A depicts a flowchart of an example process 800 of selecting a target group for classifying the text separators in accordance with some embodiments of the present disclosure. The process 800 can be implemented by the table analysis system 500, or more specifically, by the line item detector 520 in the table analysis system.

In the process 800, the line item detector 520 is configured to classify the text separators identified from the borderless table into each of a set 802 of N candidate groups (where N is larger than one). Each of the candidate groups comprising a different number of candidate clusters. As illustrated in FIG. 8A, the set 802 includes a 1-cluster group 804-1 which is configured to comprise one candidate cluster, a 2-cluster group 804-2 which is configured to comprise two candidate clusters, and a N-cluster group 804-N which is configured to comprise N candidate clusters. For the purpose of illustration, those groups are sometimes collectively or individually referred to as candidate groups 804.

It would be appreciated that the different numbers of candidate clusters preconfigured in the candidate groups are provided for the purpose of illustration. In other embodiments, the candidate groups may be configured to include candidate groups including other numbers of candidate clusters, and those numbers may not be in a continuous range. For example, the 1-cluster group may be not configured. As other examples, the set 820 may comprise a candidate group including two candidate clusters, a candidate group including four candidate clusters, and a candidate group including five candidate clusters.

In some embodiments, the number of candidate clusters in each candidate group is pre-configured, and each candidate cluster is considered to be corresponding to a different separator type. In some embodiments, the separator type(s) corresponding to the candidate cluster(s) may be pre-configured. For example, it is configured that the 2-cluster group 804-2 comprises two clusters which means that the text separators classified into the two clusters are corresponding to two different separator types including a table header separator and a table region separator. In some embodiments, the specific alignment between the candidate cluster(s) and the separator type(s) may be not pre-configured in the candidate group. After a target group is selected, alignment between the target clusters in the target groups and the separator types may then be determined. Some embodiments in this regard will be discussed in more details below.

Specifically, at block 810, the line item detector 520 determines a plurality of similarities between text lines separated by the plurality of text separators in the borderless table. For each text separator, a similarity between two text lines separated by this text separator is determined. As mentioned above, for a text separator, a text region considered in determining the similarity may include one or more text lines, such as one or more text lines above or below the text separator.

Generally, a text separator of a separator type may separate either different types of text regions in the borderless table or separate text lines within a same type of text region in the borderless table. In other words, if several text separators within a same cluster are found to be located between both different types of text regions and a same type of text region, the clustering in this candidate group may not be appropriate for the borderless table under consideration. Therefore, the similarities between the text lines separated by the text separators can be used to evaluate the results of the classifications on the candidate groups, as will be discussed below.

Figure 10:
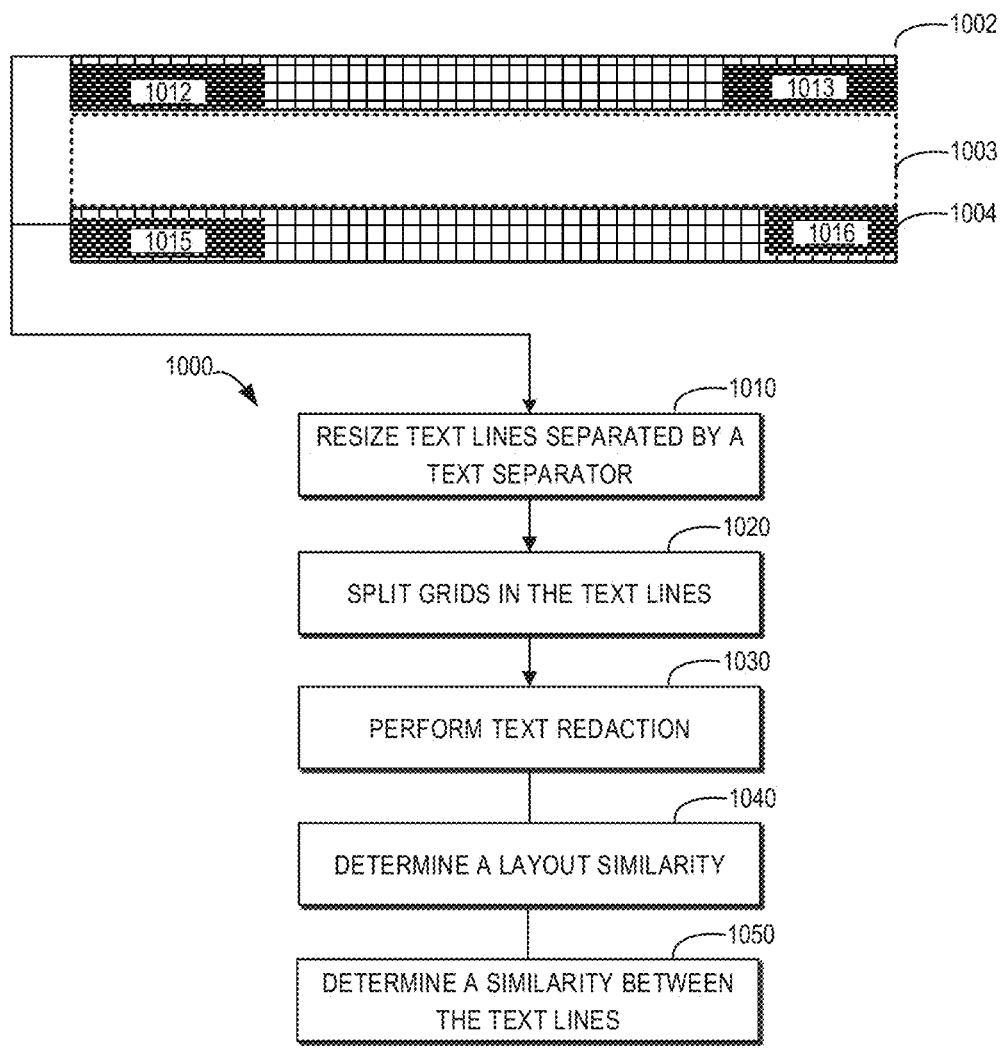
FIG. 10 depicts a flowchart of an example process of determining a similarity between text lines separated by a text separator, in accordance with an embodiment of the present invention.
Figure 11:
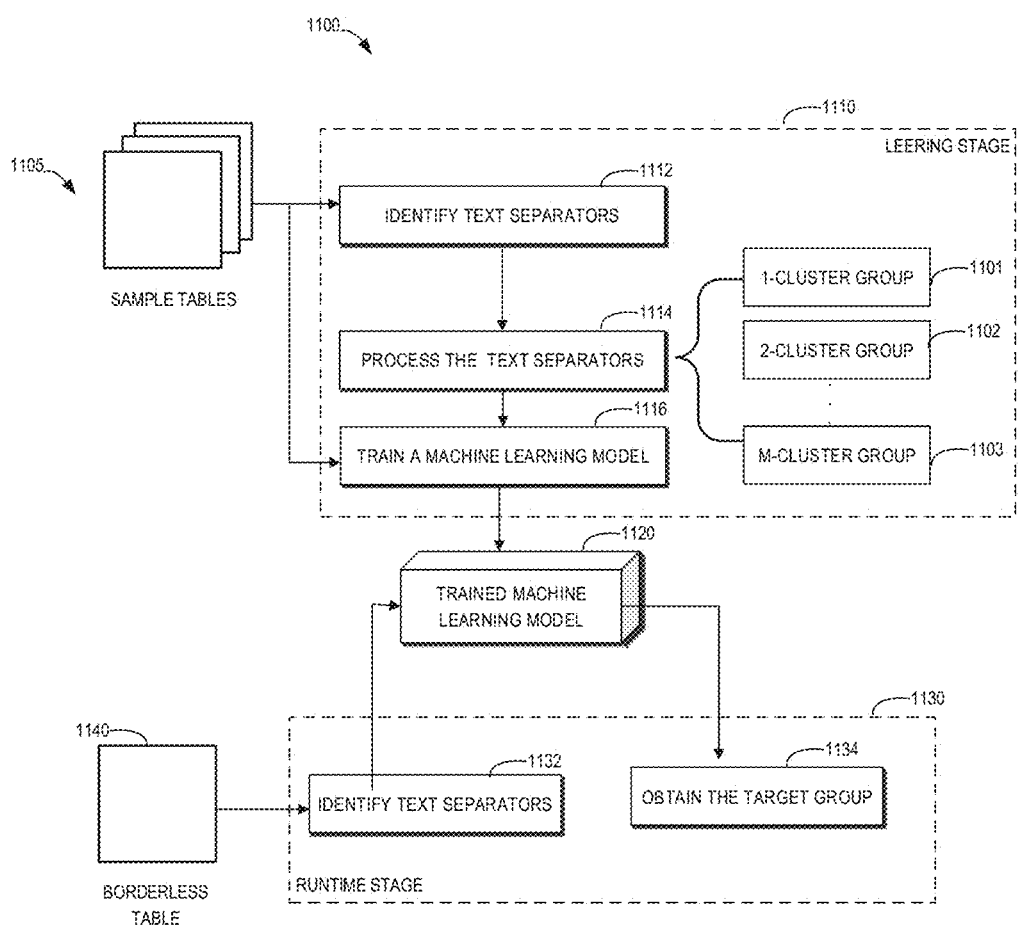
FIG. 11 depicts a flowchart of an example process of determining a similarity between text lines separated by a text separator, in accordance with an embodiment of the present invention.

There are various ways to measure a similarity between two text lines and some embodiments will be discussed in detail with reference to FIGS. 10 and 11.

The process 800 further comprises a sub-process 820 which is looped for each of the candidate groups 804. As illustrated, at block 822 of the sub-process 820, for each candidate group 804, the line item detector 520 classifies the plurality of text separators into a certain number of candidate clusters comprised in the candidate group. Classifying the text separators into the candidate clusters is similar to the classification of those text separators into the target clusters as mentioned above. For example, a clustering algorithm may be applied to cluster the text separators with the number of cluster centers set as the number of the candidate clusters in the current candidate group.

Figure 9A:
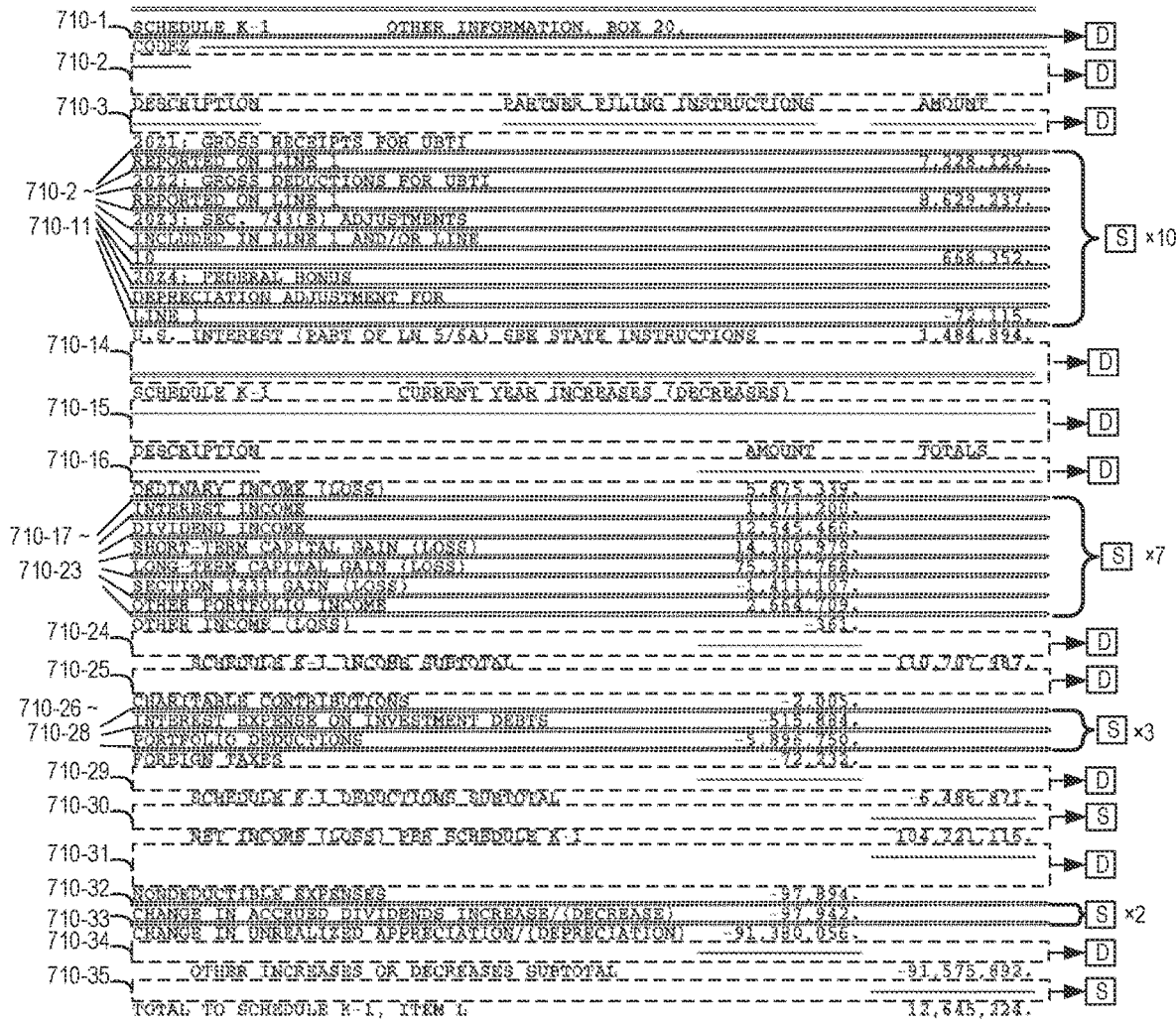
Figure 9C:
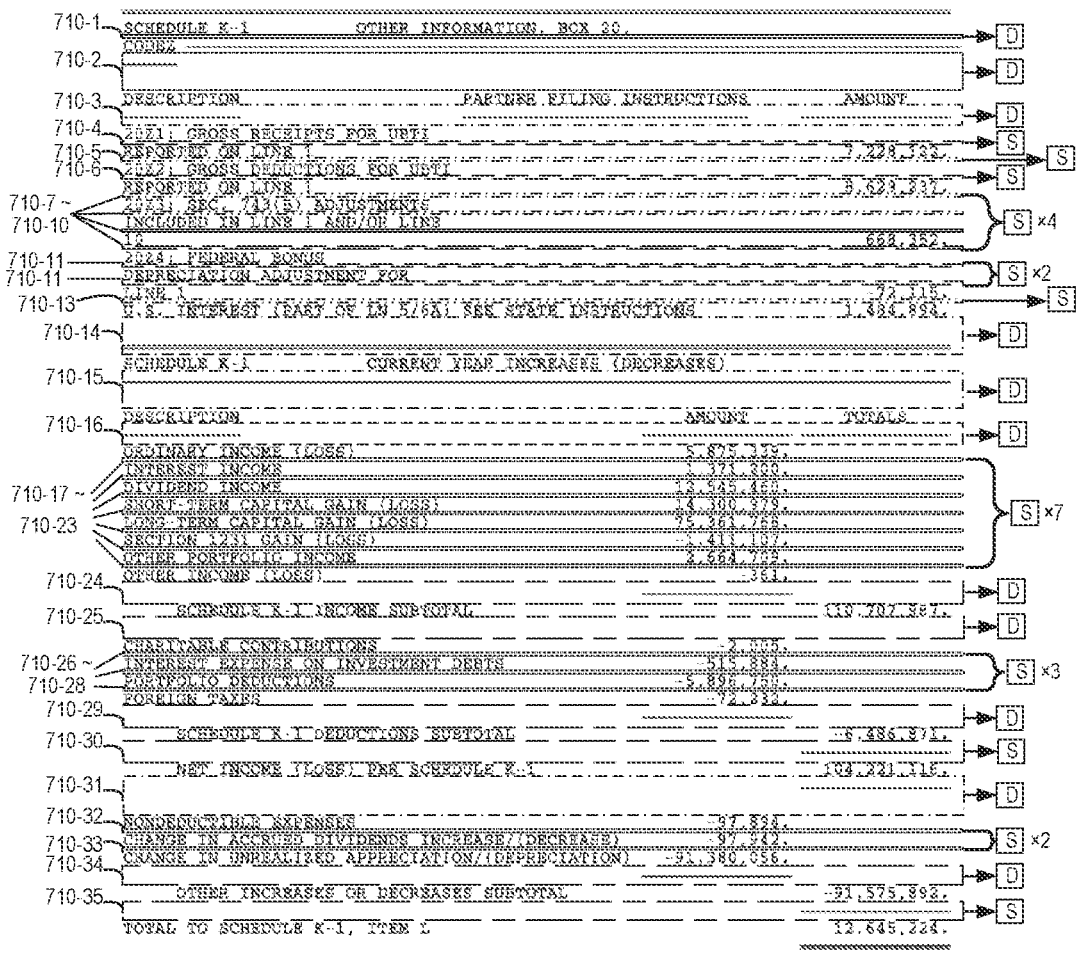

FIGS. 9A-9C depict examples of text separator classification for a 2-cluster group, a 6-cluster group, and a 8-cluster group, respectively. The example borderless table 400 in FIG. 4 and the text separators 710 identified therein as illustrated in FIG. 7 are taken as examples.

As illustrated in FIGS. 9A-9C, the text separators 710 may be classified into different ways depending on the number of the candidate clusters in the candidate groups. In FIG. 9A, after the classification, Cluster 1 in the 2-cluster group includes text separators 710-1, 710-2 through 710-11, 710-17 through 710-23, 710-26 through 710-28, 710-33, and 710-34; and Cluster 2 in the 2-cluster group includes text separators 710-2, 710-3, 710-14 through 710-16, 710-24, 710-25, 710-29 through 710-31, 710-34, and 710-35. In FIG. 9B and FIG. 9C, after the classification, the text separators classified in each cluster of the candidate groups are also illustrated.

At block 824 of the sub-process 820, the line item detector 520 determines an overall accuracy level for the candidate group based on respective distributions of the similarities for text separators classified in the certain number of candidate clusters. The overall accuracy level for the candidate group is to measure an overall accuracy of classification of the text separators in the respective candidate clusters. As mentioned above, an accurate text separator of a separator type may separate either different types of text lines in the borderless table or separate text lines within a same type of text region in the borderless table. The distribution of similarities for text separators in one candidate cluster is to indicate how those text separators separate the similar text lines (in a same text region) and dissimilar text lines (in different text regions). Thus, the overall accuracy level for the candidate group may be determined based on the distribution of the similarities.

Figure 8B:
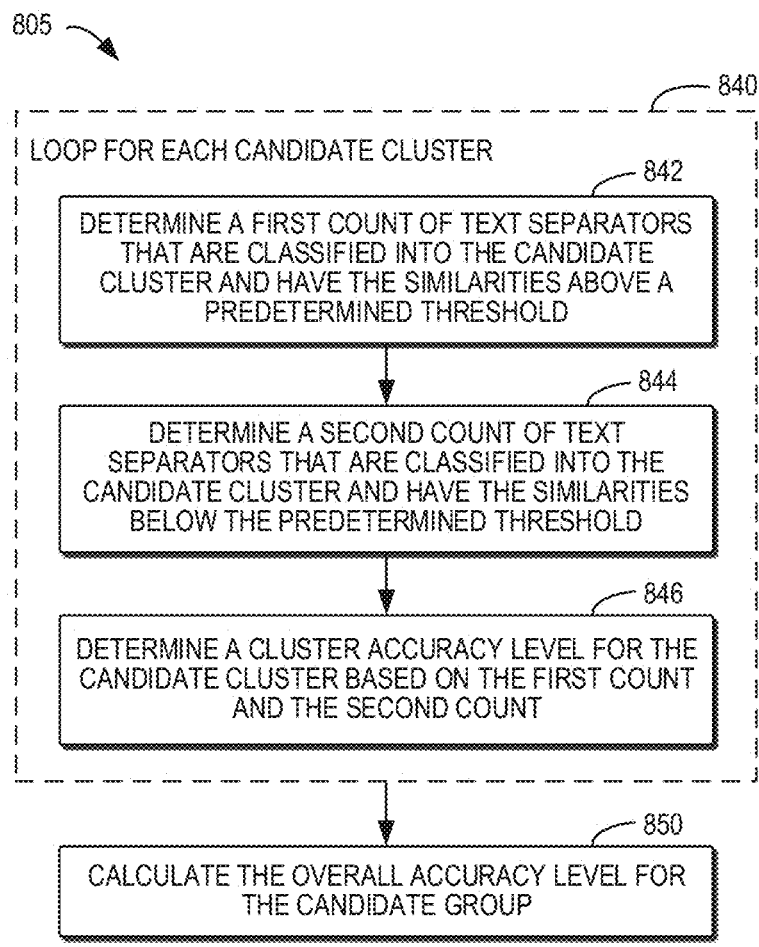
FIG. 8B depicts a flowchart of an example process of calculating an overall accuracy level for a candidate group, in accordance with an embodiment of the present invention.

FIG. 8B depicts a flowchart of an example process 805 of calculating an overall accuracy level for a candidate group in accordance with some embodiments of the present disclosure. The process 805 may be considered as an example for the determination of the overall accuracy level for a certain candidate group at block 824.

The process 805 includes a sub-process 840 which is looped for each candidate cluster in a candidate group. To determine the overall accuracy level, for each candidate cluster in a candidate group, the line item detector 520 determines a distribution of the similarities for the text separators classified into this candidate cluster. Specifically, in the sub-process 840, the line item detector 520 determines at block 842 a first count of text separators that are classified into the candidate cluster and have the similarities above (e.g., larger than or equal to) a predetermined threshold, and determines at block 844 a second count of text separators that are classified into the candidate cluster and have the similarities below the predetermined threshold. The first and second counts may indicate the distribution of the similarities for text separators in each candidate cluster. In some examples, the threshold may be determined according to applications. For example, if the similarity between text lines is measured as a value from 0 to 1, the threshold may be determined as 0.5 or any other suitable value between the range of 0 to 1.

In some embodiments, by comparing the similarity determined for a text separator with the predetermined threshold, each text separator classified based on a candidate group may be labeled as "S" if the similarity is above the threshold, or labeled as "D" if the similarity is below the threshold. In the illustrated of FIGS. 9A-9C, a text separator 710 marked with a label "S" 902 indicates that the similarity between text lines determined for this text separator 710 is above the threshold. A text separator 710 marked with a label "D" 904 indicates that the corresponding similarity is below the threshold.

By counting the numbers of the labels "S" and "D" assigned to the text separators in each candidate cluster, the first count and the second count may be determined. For example, for Cluster 1 in the 2-cluster group, the count of label "S" is 22 and the count of label "D" is 1; for Cluster 2 in the 2-cluster group, the count of label "S" is 2 and the count of label "D" is 10. The counts for the respective candidate clusters in the 6-cluster group and the 8-cluster group in FIG. 9B and FIG. 9C may also be determined accordingly.

At block 844 in the sub-process 840, for each candidate cluster in a candidate group, the line item detector 520 determines a cluster accuracy level for the candidate cluster based on the first count and the second count.

The cluster accuracy level is used to measure accuracy of the text separators classified in this cluster. If text separators in a candidate cluster can either separate different dissimilar text lines or the same/similar text lines, a cluster accuracy level for this candidate cluster may be high. Otherwise, if text separators in a candidate cluster can both separate different dissimilar text lines and the same/similar text lines, a cluster accuracy level for this candidate cluster may be low. Therefore, if the text separators can mainly separate dissimilar text lines in different types of text regions or mainly separate similar text lines within a text region, the cluster accuracy level may be determined to be a relatively high level.

In some embodiments, a higher count of the first and second counts may be selected and a ratio between the higher count and a sum of the first and second counts is calculated to determine the cluster accuracy level (block 846). For example, the cluster accuracy level may be determined as the calculated ratio. In some examples, the calculation of the cluster accuracy level may be represented as follows: Cluster_Sim=Max ((count("D"), count("S"))/[count("D")+count("S")], where count("S") represents the first count, and count("D") represents the second count.

In the example of FIG. 9A, for Cluster 1 in the 2-cluster group where the count of label "S" is 22 and the count of label "D" is 1, the cluster accuracy level may be calculated as follows: Max(1, 22)/[1+22]=22/23=0.96. For Cluster 2 in the 2-cluster group where the count of label "S" is 2 and the count of label "D" is 10, the cluster accuracy level may be calculated as follows: Max(10, 2)/[10+2]=10/12=0.83. The cluster accuracy levels for the respective candidate clusters in the 6-cluster group and the 8-cluster group in FIG. 9B and FIG. 9C may also be determined accordingly.

Reference is made back to FIG. 8B, the line item detector 520 calculates the overall accuracy level for the candidate group by aggregating the cluster accuracy levels determined for the certain number of candidate clusters (block 850). For example, the cluster accuracy levels may be averaged to determine the overall accuracy level. In the example of FIG. 9A, an overall accuracy level for the 2-cluster group may be determined as (0.96+0.83)/2=0.90. The overall accuracy levels for the 6-cluster group and the 8-cluster groups may also be determined based on their cluster accuracy levels.

Some embodiments of the calculation of the overall accuracy level for a candidate group have been discussed above with reference to FIG. 8B. Reference is made back to FIG. 8A, after the sub-process 820 is looped for all the candidate groups, the overall accuracy levels for all the candidate groups may be determined. The process 800 in FIG. 8A proceeds to block 830, where the line item detector 520 selects the target group from the plurality of candidate groups based on the overall accuracy levels determined for the plurality of candidate groups.

Figure 9D:
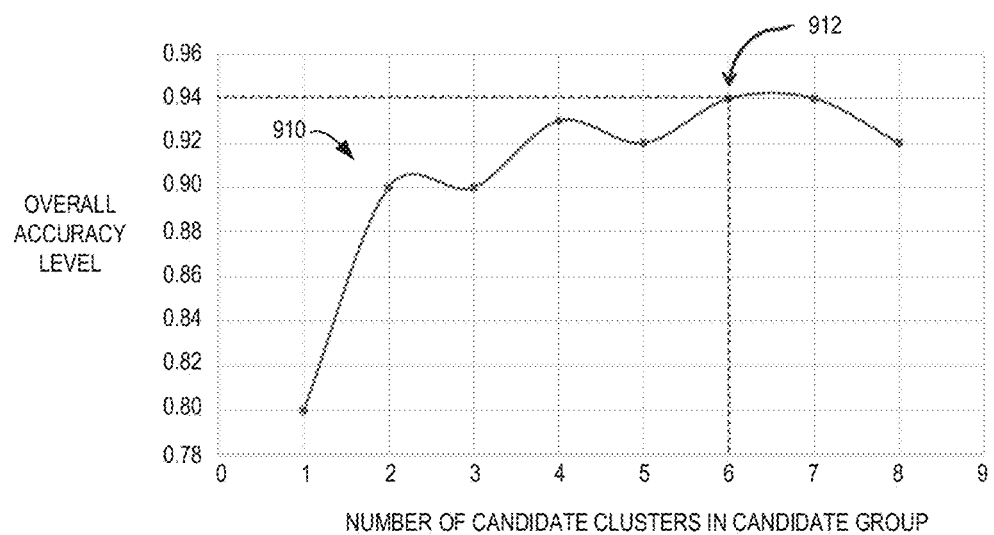
FIG. 9D depicts a curve of overall accuracy levels calculated for different candidate clusters, in accordance with an embodiment of the present invention.

Generally, the accuracy trend for the candidate groups may vary as the numbers of candidate clusters are comprised in the candidate groups. The accurate number of clusters for the text separators in a table may show the highest accuracy level. If the number of clusters is increased or decreased, the accuracy may be decreased or converged to a stable level. FIG. 9D depicts a curve 910 of overall accuracy levels calculated for different numbers of candidate clusters in accordance with some embodiments of the present disclosure. As can be seen, the overall accuracy level increased from one cluster and reaches the highest value 912 when the number of candidate clusters reaches 6. The overall accuracy level decreases when the number of candidate clusters is set to 8.

According to such observations, in some embodiments, a candidate group with a highest overall accuracy level may be selected as the target group for classifying the text separators in the borderless table. In some embodiments, the overall accuracy levels for the candidate groups may be sorted to find the highest overall accuracy level. In some embodiments, if the selected target group may be the one with a highest overall accuracy level and comprises a lowest number of candidate.

For example, if the overall accuracy level converges to a relatively stable level as the number of candidate clusters increases, the lowest number may be selected. For example, in FIG. 9D, the overall accuracy level determined for six candidate clusters is the same as the overall accuracy level determined for seven candidate clusters, both being the highest value. Then a candidate group comprising the six candidate clusters may be selected as the target group to classify the text separators.

In the above embodiments, a similarity between text lines separated by a text separator is needed to be determined in order to facilitate the selection of the target group. In some embodiments, the similarity between text lines may be determined based on layouts in the text lines. FIG. 10 depicts a flowchart of an example process 1000 of determining a similarity between text lines separated by a text separator in accordance with some embodiments of the present disclosure. The process 1000 may be considered as an example for the determination of the similarities between text lines at block 810.

As illustrated, it is assumed that the process 1000 is performed to determine a similarity between text lines 1002 and 1004 separated by a text separator 1003. It would be appreciated that the text lines 1002 and 1004 are illustrated for the purpose of illustration only, without suggesting any limitation to the scope of the present disclosure.

At block 1010, the line item detector 520 resizes the text lines 1002 and 1004 separated by the text separator 1003, for example, to a predetermined size. At block 1020, the line item detector 520 splits grids in the text lines 1002 and 1004. Each grid may be of a same size. The grid splitting performed on the text lines 1002 and 1004 is to enable easy comparison of the layouts between the two text lines. In some embodiments, the grid splitting at block 1020 may be omitted.

At block 1030, the line item detector 520 performs text redactions on the text lines 1002 and 1004, for example, to mask the text present in the text lines. The text masking is to avoid the negative impact of possible different texts on determining the similarity.

Though the resizing, grid splitting, and text redaction, two adjusted text lines 1002 and 1004 may be obtained.

At block 1040, the line item detector 520 determines a layout similarity between the adjusted text lines 1002 and 1004. The layout similarity indicates a similarity level between layouts of the two text lines. The layout similarity may be determined based on the shape, the geometry, the distribution of the masked portions (1012-1013 and/or 1015-1016), and/or any other aspects related to the layouts of the adjusted text lines 1002 and 1004. In some embodiments, if the layouts between the two text lines are similar (for example, higher than a threshold), it may indicate that the two text lines are similar and may locate within a same type of text region (e.g., a table header, a table summary, a table body, or the like) in the borderless table. Otherwise, if the layouts between the two text lines are dissimilar (for example, higher than a threshold), it may indicate that the two text lines are dissimilar with each other and thus may locate within different text regions (a table header and a table body).

At block 1050, the line item detector 520 determines a similarity between the text lines based on the layout similarity. For example, the similarity between the text lines may be determined as the layout similarity. In some embodiments, in addition to the layout similarity or as an alternative, the similarity between the text lines may be determined based on one or more other factors.

In some embodiments, a learning algorithm may be applied to automatically determine a suitable number of target clusters into which the text separators are classified. FIG. 11 depicts a flowchart of an example process 1100 of determining a similarity between text lines separated by a text separator in accordance with some other embodiments of the present disclosure.

The process 1100 may involve a learning stage 1110 and a runtime stage 1130. The learning stage 1110 may be implemented at the table analysis system 500 or at other external or remote computing devices/systems. The runtime stage 1130 may be implemented at the table analysis system 500, or more specifically, at the line item detector 520.

In the learning stage 1110, a machine learning model is trained to determine an accurate number of clusters for a borderless table. A set of sample tables 1105 may be collected as training data to train the machine learning model. The sample tables 1105 may include borderless tables. At block 1112 in the learning stage 1110, text separators are identified from the respective sample tables 1104.

At block 1114 in the learning stage 1110, the identified text separators are processed, to determine a best number of clusters for each sample table 1105. For example, a plurality of candidate groups are provided, including a 1-cluster group 1101, a 2-cluster group 1102, . . . , and a M-cluster 1103 (where M is larger than two). The processing of the text separators is to determine which candidate group can be selected as a target group for classifying the text separators in a sample table. The selection of the target group as discussed above with reference to FIGS. 8A-8B and FIGS. 9A-9D may be applied here to select the best number of clusters for the sample tables 1105. Through the processing, for each sample table 1105, the best numbers of clusters may be determined.

At block 1116, a machine learning model 1120 is trained based on the text separators for the sample tables 1105 and the best numbers of clusters determined for the samples table 1105 (both of which can act as training data for the model). Any suitable training algorithms may be applied to train the machine learning model 1120. Through the learning process, the machine learning model 1120 may extract characteristics of the text separators and learn an association between text separators in a borderless table and a best number of clusters into which the text separators can be classified. For example, the machine learning model 1120 may learn from the training data that a number of five clusters are appropriate for classifying text separators in a type of receipt, and a number of five clusters are appropriate for classifying text separators in a type of invoice, and so on.

The trained machine learning model 1120 may be stored and may be applied in the runtime stage to select a target group for a new borderless table 1140. Specifically, if a new borderless table 1140 is received in the runtime stage 1130, at block 1132, text separators in the borderless table 1140 are identified, and input to the trained machine learning model 1120. Depending on various characteristics of the text separators in the borderless table 1140, the machine learning model 1120 may output a target group comprising a suitable number of clusters for classifying the text separators in the borderless table 1140. Accordingly, at block 1134 of the runtime stage 1130, the target group may be obtained.

In the above discussions, the embodiments of selecting the target group for a borderless table to be processed have been discussed. With the target group determined, as discussed in the process 600, the text separators in the borderless table to be processed may be classified depending on the number of target clusters configured on the target group. In some embodiments, it can be determined which target cluster of the target group is corresponding to which separator type. In some embodiments, alignment between the target clusters in the target groups and the separator types may then be determined based on the property information related to the text separators classified into the target clusters.

Different separator types corresponding to the target clusters may be associated with reference property information. In some embodiments, the reference property information for the different separator types may be selected as properties that can be used to distinguish the separator types although those separator types may share some common property information. For example, for three separator types including a table header separator, a table row separator, and an in-cell line separator, their heights are generally different between text lines.

The line item detector 520 may compare the property information related to the text separators classified into the respective target clusters with the reference property information associated with the number of separator types. If the property information related to the text separators in one target cluster matches with the reference property information associated with a certain separator type, it may be determined that this target cluster is corresponding to the target separator type.

Figure 12:
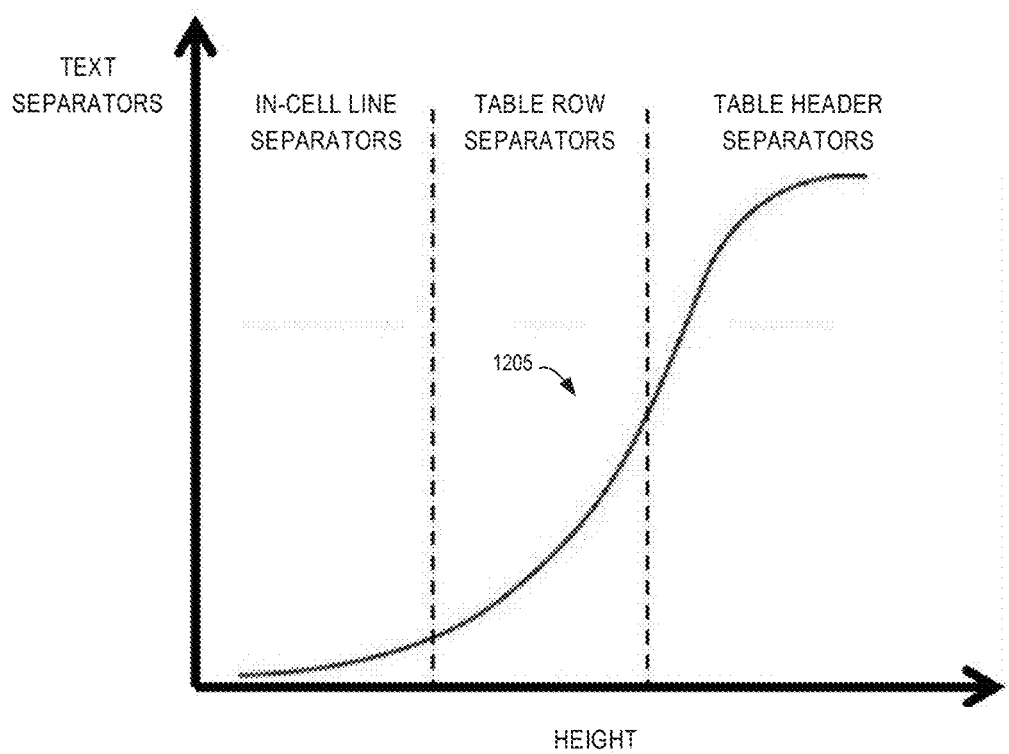
FIG. 12 depicts an example curve of heights for different separator types, in accordance with an embodiment of the present invention.

As illustrated in FIG. 12, a curve 1205 shows heights for different separator types in accordance with some embodiments of the present disclosure. In-cell line separators generally have heights lower than table row separators, and table row separators generally have heights lower than table header separators. In some examples, the reference property information for each of the three separator types may be determined as a specific range of heights. After the text separators are classified into the target clusters in the target group, heights of the text separators in each target clusters may be determined and an average height for this target cluster may be determined. If the average height falls into a range of height set for one of the three separator types, the target cluster may be determined to be corresponding to that separator type.

It would be appreciated that the heights of the separator types are provided as a specific example and other property information related to the text separators may also be used to distinguish different separator types and thus can be used for aligning the target clusters with the separator types.

In some embodiments, after aligning the separator types with the target clusters, the indication information may specifically indicate the separator types of the text separators classified in the target clusters. For example, it is assumed that a first target cluster is aligned to the first separator type and a second target cluster is aligned to the second separator type. Then the line item detector 510 may assign the first separator type to one or more text separators classified in the first cluster, and assign the second separator type to one or more text separators classified in the second cluster. The indication information may indicate the first and second separator types assigned to the text separators classified in the first and second target clusters. The indication information may be provided to further analysis on the borderless table.

In some embodiments, if the text lines in the borderless table are detected in the horizontal direction, the text separators may be able to indicate the text layout in the horizontal direction. The table analysis system 500 may further perform vertical layout analysis on the borderless table based on the result of the classifying of the text separators.

Figure 13:
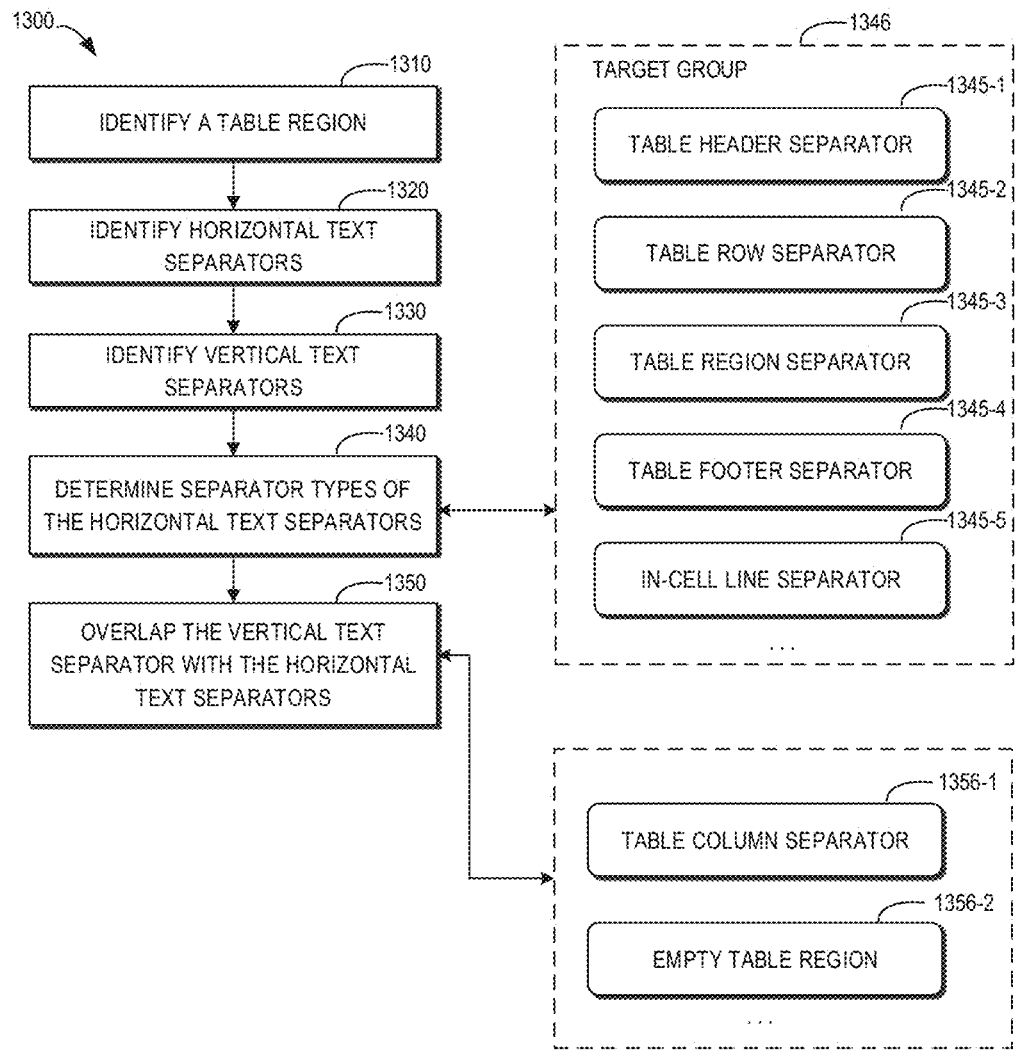
FIG. 13 depicts a flowchart of an example overall process of line item detection, in accordance with an embodiment of the present invention.

FIG. 13 depicts a flowchart of an example overall process 1300 of table analysis in accordance with some embodiments of the present disclosure. The process 1300 may be implemented at the table analysis system 500 and involves both the horizontal and vertical layout analysis.

At block 1310, the table analysis system 500 identifies a table region for a borderless table from a document. At block 1320, the table analysis system 500 identifies horizontal text separators from the borderless table as text lines in this table are arranged in a horizontal direction. At block 1330, the table analysis system 500 identifies vertical text separators from the borderless table, each vertical text separator defining a non-text region with text located the right and left sides of the non-text region.

Figure 14:
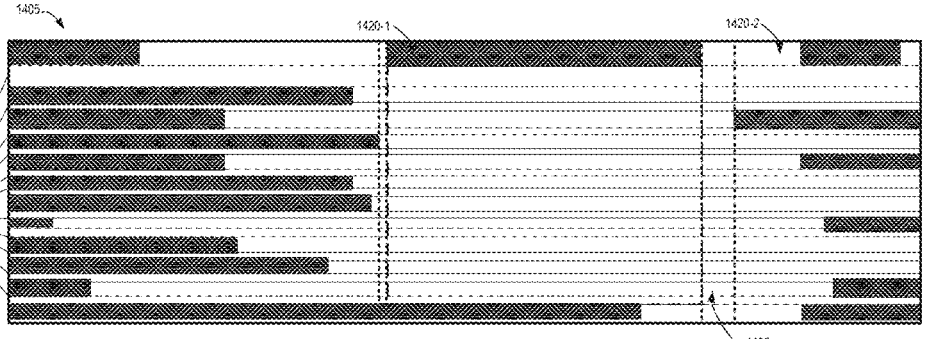
FIG. 14 depicts an example of aligning text separators to separator types, in accordance with an embodiment of the present invention.

FIG. 14 depicts an example of aligning text separators to separator types in accordance with some embodiments of the present disclosure. For an example borderless table 1400, a number of horizontal text separators 1410 may be identified as illustrated in a representation 1405, each separating two continuous horizontal text lines in the borderless table 1400. Vertical text separators 1420-1 and 1420-2 may also be identified.

Still referring to FIG. 13, at block 1340, the table analysis system 500 determines separator types of the horizontal text separators. The determination of the separator types may be performed according to some embodiments as discussed above. For example, the separator types of the horizontal text separators may include table header separator 1345-1, table row separator 1345-2, table region separator 1345-3, table footer separator 1345-4, in-cell line separator 1345-5 in a target group 1346. It would be appreciated that those separator types are illustrated as a specific example.

With the separator types of the horizontal text separators determined, at block 1350, the table analysis system 500 overlaps the vertical text separators with the horizontal text separators. The overlapping result may be used to further indicate more text layout information about the borderless table. For example, by overlapping the vertical text separators with the horizontal text separators, it is possible to further determine whether any of the vertical text separators is a table column separator 1356-1 which separates two columns in a table. In the illustrated example of FIG. 14, the vertical text separators 1420-1 and 1420-2 may be determined as table column separators to separate columns. In some embodiments, the overlapping of the horizontal text separators and vertical text separators may further be used to indicate an empty table region 1356-2 in the borderless table. For example, in the example of FIG. 14, an empty table region 1430 of the borderless table 1400 may be determined because this region is bounded by two horizontal text separators 1410 and the vertical text separators 1420-1 and 1420-2.

It would be appreciated that some example of the horizontal and vertical layout analysis based on the text separators are provided above. The text separators with their separator types identified can be used in various other ways in the table analysis tasks.

It should be noted that the table analysis processes, the table analysis system 500, the table region detector 510, or the line item detector 520 according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying, by one or more processors, a plurality of text separators in a borderless table, a text separator of the plurality of text separators defining a non-text region between two consecutive text lines in the borderless table;
   classifying, by one or more processors, each text separator of the plurality of text separators into one of a plurality of target clusters, each target cluster corresponding to property information of a separator type;
   selecting, by one or more processors, a target group that includes the plurality of target clusters based on:
      determining, by one or more processors, whether each text separator of the plurality of separators separates text lines that meet a similarity threshold; and
      determining, by one or more processors, an accuracy level for the target group, the accuracy level based on a distribution of the text separators within the plurality of target clusters and the corresponding similarity threshold designation for each respective text separator within each respective target cluster; and providing, by one or more processors, indication information to indicate respective separator types of the plurality of text separators based on a result of the classifying.

2. The computer-implemented method of claim 1, wherein the property information comprises information about a selection of visual properties of the non-text regions defined by the plurality of text separators from the group consisting of: lines, bold lines, and dashed lines.

3. The computer-implemented method of claim 1, wherein the target group is selected from a plurality of candidate groups comprising different numbers of candidate clusters, and selecting the target group further comprises:

for each of a plurality of candidate groups comprising different numbers of candidate clusters:
classifying, by one or more processors, each text separator of the plurality of text separators into a certain number of candidate clusters comprised in the candidate group; and
determining, by one or more processors, an overall accuracy level for the candidate group based on respective distributions of the similarities for text separators classified in the certain number of candidate clusters; and selecting, by one or more processors, the target group from the plurality of candidate groups based on the overall accuracy levels determined for the plurality of candidate groups.

4. The computer-implemented method of claim 3, wherein determining the overall accuracy level for the candidate group comprises:

for each of the certain number of candidate clusters comprised in the candidate group, determining, by one or more processors, a distribution of the similarities for the text separators classified into the candidate cluster by:
determining, by one or more processors, a first count of text separators that are classified into the candidate cluster and have the similarities above a predetermined threshold; and
determining, by one or more processors, a second count of text separators that are classified into the candidate cluster and have the similarities below the predetermined threshold;

for each of the certain number of candidate clusters, determining, by one or more processors, a cluster accuracy level for the candidate cluster based on the first count and the second count; and calculating, by one or more processors, the overall accuracy level for the candidate group by aggregating the cluster accuracy levels determined for the certain number of candidate clusters.

5. The computer-implemented method of claim 4, wherein determining the cluster accuracy level for the candidate cluster based on the first count and the second count comprises:

calculating, by one or more processors, a ratio of a higher one of the first and second counts to a sum of the first and second counts; and
determining, by one or more processors, the cluster accuracy level based on the ratio.

6. The computer-implemented method of claim 3, wherein selecting the target group from the plurality of candidate groups comprises:

sorting, by one or more processors, the overall accuracy levels for the plurality of candidate groups; and
selecting, by one or more processors, a candidate group with a highest overall accuracy level from the plurality of candidate groups, as the target group.

7. The computer-implemented method of claim 6, wherein selecting a candidate group with a highest overall accuracy level further comprises selecting, by one or more processor, a candidate group comprising a lowest number of candidate clusters.

8. The computer-implemented method of claim 1, further comprising:

comparing, by one or more processor, the property information of the text separators classified into respective clusters of the plurality of target clusters with reference property information; and
assigning, by one or more processor, the plurality of target clusters to be corresponding to each separator type, respectively, based on a result of the comparing.

9. The computer-implemented method of claim 1, wherein providing the indication information comprises:

assigning, by one or more processor, a first separator type to at least one of the plurality of text separators classified in a first cluster of the plurality of target clusters, the first target cluster aligned with the first separator type;
assigning, by one or more processor, a second separator type to at least one of the plurality of text separators classified in a second cluster of the plurality of target clusters, the second target cluster aligned with the second separator type; and
providing, by one or more processor, the indication information to at least indicate the first and second separator types assigned to the text separators classified in the first and second target clusters.

10. A computer program product comprising:

one or more computer readable storage devices, and program instructions collectively stored on the one or more computer readable storage devices, the program instructions comprising:
program instructions to identify a plurality of text separators in a borderless table, a text separator of the plurality of text separators defining a non-text region between two consecutive text lines in the borderless table;
program instructions to classify each text separator of the plurality of text separators into one of a plurality of target clusters, each target cluster corresponding to property information of a separator type;
program instructions to select a target group that includes the plurality of target clusters based on:
determining whether each text separator of the plurality of separators separates text lines that meet a similarity threshold; and
determining an accuracy level for the target group, the accuracy level based on a distribution of the text separators within the plurality of target clusters and the corresponding similarity threshold designation for each respective text separator within each respective target cluster; and
program instructions to provide indication information to indicate respective separator types of the plurality of text separators based on a result of the classifying.

11. The computer program product of claim 10, wherein the property information comprises information about a selection of visual properties of the non-text regions defined by the plurality of text separators from the group consisting of: lines, bold lines, and dashed lines.

12. The computer program product of claim 10, wherein the target group is selected from a plurality of candidate groups comprising different numbers of candidate clusters, and selecting the target group further comprises:
program instructions to, for each of a plurality of candidate groups comprising different numbers of candidate clusters:
classify each text separator of the plurality of text separators into a certain number of candidate clusters comprised in the candidate group; and
determine an overall accuracy level for the candidate group based on respective distributions of the similarities for text separators classified in the certain number of candidate clusters; and
program instructions to select the target group from the plurality of candidate groups based on the overall accuracy levels determined for the plurality of candidate groups.

13. The computer program product of claim 12, wherein program instructions to determine the overall accuracy level for the candidate group comprise:
program instructions to, for each of the certain number of candidate clusters comprised in the candidate group, determine a distribution of the similarities for the text separators classified into the candidate cluster by:
determining a first count of text separators that are classified into the candidate cluster and have the similarities above a predetermined threshold; and
determining a second count of text separators that are classified into the candidate cluster and have the similarities below the predetermined threshold;
program instructions to, for each of the certain number of candidate clusters, determine a cluster accuracy level for the candidate cluster based on the first count and the second count; and
program instructions to calculate the overall accuracy level for the candidate group by aggregating the cluster accuracy levels determined for the certain number of candidate clusters.

14. The computer program product of claim 13, wherein program instructions to determine the cluster accuracy level for the candidate cluster based on the first count and the second count comprise:
program instructions to calculate a ratio of a higher one of the first and second counts to a sum of the first and second counts; and
program instructions to determine the cluster accuracy level based on the ratio.

15. The computer program product of claim 12, wherein program instructions to select the target group from the plurality of candidate groups comprise:
program instructions to sort the overall accuracy levels for the plurality of candidate groups; and
program instructions to select a candidate group with a highest overall accuracy level from the plurality of candidate groups, as the target group.

16. The computer program product of claim 15, wherein program instructions to select a candidate group with a highest overall accuracy level further comprising selecting, by one or more processor, a candidate group comprising a lowest number of candidate clusters.

17. The computer program product of claim 10, further comprising:
program instructions, collectively stored on the one or more computer readable storage devices, to compare the property information of the text separators classified into respective clusters of the plurality of target clusters with reference property information; and
program instructions, collectively stored on the one or more computer readable storage devices, to assign the plurality of target clusters to be corresponding to each separator type, respectively, based on a result of the comparing.

18. The computer program product of claim 10, wherein program instructions to provide the indication information comprise:
program instructions to assign a first separator type to at least one of the plurality of text separators classified in a first cluster of the plurality of target clusters, the first target cluster aligned with the first separator type;
program instructions to assign a second separator type to at least one of the plurality of text separators classified in a second cluster of the plurality of target clusters, the second target cluster aligned with the second separator type; and
program instructions to provide the indication information to at least indicate the first and second separator types assigned to the text separators classified in the first and second target clusters.

19. A computer system comprising:
one or more computer processors, one or more computer readable storage media, and program instructions collectively stored on the one or more computer readable storage media for execution by at least one of the one or more computer processors, the program instructions comprising:
program instructions to identify a plurality of text separators in a borderless table, a text separator of the plurality of text separators defining a non-text region between two consecutive text lines in the borderless table;
program instructions to classify each text separator of the plurality of text separators into one of a plurality of target clusters, each target cluster corresponding to property information of a separator type;
program instructions to select a target group that includes the plurality of target clusters based on:
determining whether each text separator of the plurality of separators separates text lines that meet a similarity threshold; and
determining an accuracy level for the target group, the accuracy level based on a distribution of the text separators within the plurality of target clusters and the corresponding similarity threshold designation for each respective text separator within each respective target cluster; and
program instructions to provide indication information to indicate respective separator types of the plurality of text separators based on a result of the classifying.

20. The computer system of claim 19, wherein the property information comprises information about a selection of visual properties of the non-text regions defined by the plurality of text separators from the group consisting of: lines, bold lines, and dashed lines.

* * * * *